United States Patent
Kadgaonkar et al.

(10) Patent No.: US 11,465,132 B2
(45) Date of Patent: Oct. 11, 2022

(54) FLUID CATALYTIC CRACKING ADDITIVE COMPOSITION FOR ENHANCING GASOLINE OCTANE BARREL AND A PROCESS OF PREPARATION THEREOF

(71) Applicant: INDIAN OIL CORPORATION LIMITED, Mumbai (IN)

(72) Inventors: Mahesh Kadgaonkar, Faridabad (IN); Arumugam Velayutham Karthikeyani, Faridabad (IN); Kumaresan Loganathan, Faridabad (IN); Balaiah Swamy, Faridabad (IN); Velusamy Chidambaram, Faridabad (IN); Biswanath Sarkar, Faridabad (IN); Alex Cheru Pulikottil, Faridabad (IN); Vineeth Venu Nath, Faridabad (IN); Ram Mohan Thakur, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 23 days.

(21) Appl. No.: 17/037,424

(22) Filed: Sep. 29, 2020

(65) Prior Publication Data
US 2021/0101137 A1 Apr. 8, 2021

(30) Foreign Application Priority Data

Oct. 4, 2019 (IN) .............................. 201921040347

(51) Int. Cl.
| | | |
|---|---|---|
| B01J 29/40 | (2006.01) | |
| B01J 21/04 | (2006.01) | |
| B01J 21/08 | (2006.01) | |
| B01J 21/16 | (2006.01) | |
| B01J 27/24 | (2006.01) | |
| C10G 11/05 | (2006.01) | |
| C10L 1/06 | (2006.01) | |
| C10L 10/10 | (2006.01) | |

(52) U.S. Cl.
CPC .............. *B01J 29/40* (2013.01); *B01J 21/04* (2013.01); *B01J 21/08* (2013.01); *B01J 21/16* (2013.01); *B01J 27/24* (2013.01); *C10G 11/05* (2013.01); *C10L 1/06* (2013.01); *C10L 10/10* (2013.01); *C10G 2300/104* (2013.01); *C10G 2300/1044* (2013.01); *C10G 2300/301* (2013.01); *C10G 2300/305* (2013.01); *C10G 2300/70* (2013.01); *C10G 2400/02* (2013.01); *C10L 2200/0423* (2013.01); *C10L 2270/023* (2013.01)

(58) Field of Classification Search
CPC ... B01J 29/40; B01J 21/04; B01J 21/08; B01J 21/16; B01J 27/24; C10G 11/05; C10G 2300/104; C10G 2300/1044; C10G 2300/301; C10G 2300/305; C10G 2300/70; C10G 2400/02; C10L 1/06; C10L 10/10; C10L 2200/0423; C10L 2270/023
USPC ........................................................... 502/68
See application file for complete search history.

(56) References Cited

U.S. PATENT DOCUMENTS

| | | |
|---|---|---|
| 4,549,956 A | 10/1985 | Chu |
| 4,614,578 A | 9/1986 | Chester et al. |
| 4,828,679 A | 5/1989 | Cormier, Jr. et al. |
| 4,867,863 A | 9/1989 | Herbst et al. |
| 4,973,399 A * | 11/1990 | Green .................... B01J 29/072 502/67 |
| 5,147,836 A * | 9/1992 | Cheng ..................... B01J 21/12 502/263 |
| 5,179,054 A | 1/1993 | Schipper et al. |
| 5,302,567 A | 4/1994 | Miller et al. |
| 10,328,388 B2 | 6/2019 | Dumbuya et al. |
| 2003/0166453 A1 | 9/2003 | Kuvettu et al. |
| 2007/0209969 A1 | 9/2007 | Shen et al. |
| 2008/0015105 A1 | 1/2008 | Lau et al. |
| 2014/0116923 A1* | 5/2014 | Din ........................ C10G 11/05 208/120.25 |
| 2014/0235429 A1 | 8/2014 | Karthikeyani et al. |
| 2016/0059213 A1* | 3/2016 | Chidambaram ..... B01J 35/1066 208/120.01 |
| 2017/0056865 A1 | 3/2017 | Kuvettu et al. |

(Continued)

FOREIGN PATENT DOCUMENTS

| | | |
|---|---|---|
| CN | 101454080 A | 6/2009 |
| EP | 2548644 A1 | 1/2013 |
| EP | 3135373 A1 | 3/2017 |

(Continued)

*Primary Examiner* — Brian A McCaig

(74) *Attorney, Agent, or Firm* — Maschoff Brennan

(57) ABSTRACT

This invention relates to an additive capable of increasing the gasoline octane (by 2-3 units) with minimum loss of gasoline. More specifically, the present invention discloses a fluid catalytic cracking additive composition capable of enhancing gasoline octane, said composition comprising 5-50 wt. % zeolite component, 0-15 wt % alumina, 5-20 wt % colloidal silica, 10-60 wt % kaolin clay, 5-15 wt % phosphate, and 0.1 to 5.0 wt. % of bivalent metal selected from Group-IIA or Group-IB, wherein the zeolite component comprises of medium pore pentasil zeolite in an amount of 1 to 50 wt. % and said zeolite consists of one or more MFI topology zeolite having $SiO_2/Al_2O_3$ mole ratio in the range of 10-280. The present invention also discloses a process for preparation of the additive.

7 Claims, No Drawings

(56) References Cited

U.S. PATENT DOCUMENTS

2017/0144139 A1    5/2017   Kadgaonkar et al.
2020/0086304 A1*   3/2020   Kuvettu ................. B01J 29/088

FOREIGN PATENT DOCUMENTS

| | | |
|---|---|---|
| EP | 2998020 B1 | 11/2017 |
| JP | 3545652 B2 | 7/2004 |
| RU | 2412760 C2 | 2/2011 |
| RU | 2427424 C2 | 8/2011 |

* cited by examiner

FLUID CATALYTIC CRACKING ADDITIVE COMPOSITION FOR ENHANCING GASOLINE OCTANE BARREL AND A PROCESS OF PREPARATION THEREOF

FIELD OF THE INVENTION

This invention relates to an additive capable of increasing the gasoline octane (by 2-3 units) with minimum loss of gasoline. More specifically, the present invention discloses a fluid catalytic cracking additive composition capable of enhancing gasoline octane, said composition comprising 5-50 wt. % zeolite component, 0-15 wt % alumina, 5-20 wt % colloidal silica, 10-60 wt % kaolin clay, 5-15 wt % phosphate, and 0.1 to 5.0 wt. % of bivalent metal selected from Group-IIA or Group-IB, wherein the zeolite component comprises of medium pore pentasil zeolite in an amount of 1 to 50 wt. % and said zeolite consists of one or more MFI topology zeolite having $SiO_2/Al_2O_3$ mole ratio in the range of 10-280. The present invention also discloses a process for preparation of the additive.

BACKGROUND OF THE INVENTION

FCC gasoline contributes around 40-50% to total gasoline pool and ensuring the required gasoline octane is of prime consideration in FCCU operation. Conventionally, refiners use ZSM-5 additives in FCC operation to enhance the gasoline octane; however use of these conventional additives invariably reduces the gasoline yield. Therefore, to increase the gasoline octane with minimum gasoline loss is critical and challenging. Present invention deals with development of customized additive formulation employing a proprietary zeolite system that can generate more selectively high-octane molecules in gasoline without appreciable cracking the gasoline which resulted in minimal gasoline yield loss over zeolite-Y based FCC catalyst.

U.S. Pat. No. 4,828,679 describes octane and total yield improvement in catalytic cracking of petroleum fractions under cracking conditions to be obtained by adding the conventional cracking catalyst with small amount of an additive catalyst comprising a class of zeolites characterized by silica to Alumina molar ratio greater than 12 and constraint index of 1 to 12 wherein the zeolite additive catalyst has a crystal size of 0.2 to 10 micron.

U.S. Pat. No. 4,867,863 prescribes a process for catalytically deep cut vacuum gas oils, resid or other reduced crudes containing metal contaminants to increase gasoline octane. Hydrocarbon feedstock which includes vanadium and sodium contaminants are introduced into the reaction zone of a catalytic cracking unit. Catalytic cracking catalyst includes a ZSM-5 type catalytic component contacted in the reaction zone with metal containing hydrocarbon feedstock. The hydrocarbon feedstock is cracked at high temperature by cracking catalyst resulting in increased gasoline octane and surprising tolerance of the ZSM-5 type catalytic component to poisoning from usually expected synergistically destructive combination of sodium and vanadium on Y type zeolite.

U.S. Pat. No. 4,867,863 discloses a catalytic promoter comprising of 5-65 wt % of modified HZSM-5 zeolite with Zn, P, Ga, Al, Ni and rare earth elements in an amount 0.01-10.37 wt % based on total weight of HZSM-5 zeolite to increase gasoline octane number and an increased lower olefin yield.

U.S. Pat. No. 4,549,956 refers to addition of AgHZSM-5 to conventional cracking catalysts results in a significant increase in gasoline octane without undue loss in gasoline yield. This octane increase is greater than could be achieved by adding normal HZSM-5.

U.S. Pat. No. 4,614,578 refers to octane and total yield improvement in catalytic cracking processes by the addition to conventional cracking catalysts of very small amounts of additive catalyst comprising a class of zeolites characterized by silica to alumina mole ratio greater than about 12 and a constraint index of about 1 to 12. The additive catalyst is added to the conventional cracking catalyst in the cracking process in an amount which provides the zeolite component of the additive catalyst at from about 0.01 weight percent to about 1.0 weight percent of the conventional cracking catalyst in the cracking process.

U.S. Pat. No. 5,302,567 relates to a FCC catalyst for the catalytic cracking of hydrocarbons wherein said catalyst comprises a conventional cracking catalyst dispersed in an inorganic matrix and a zeolite additive composition comprising a medium-pore zeolite selected from the group consisting of ZSM-5, ZSM-11, ZSM-12, ZSM-23, ZSM-35, and ZSM-38 to improve the octane number of the gasoline-range product of an FCC process.

The above prior art describes a use of conventional ZSM-5 along the faujasite zeolite in the different proportion, use of non-zeolitic materials such as AlPO and SAPO, Silica-alumina amorphous matrix, modified HZSM-5 zeolite with Zn, P, Ga, Al, Ni and rare earth elements, class of zeolites with Silica to Alumina molar ratio greater than 12 and zeolite having constraint index of 1 to 12 wherein the zeolite additive catalyst has a crystal size of 0.2 to 10 micron.

None of the above prior arts disclose the use of combination and optimization of MFI type zeolite with variable $SiO_2/Al_2O_3$ mole ratio. Further, the optimization of combination of MFI type zeolite with variable $SiO_2/Al_2O_3$ mole ratio improve the octane number of gasoline with minimum loss is also not disclosed in the above prior arts.

Objectives of the Present Invention

An object of this invention is to increase the octane of gasoline with minimum reduction of the gasoline yield over conventional zeolite Y based FCC base catalyst in FCC operation.

Another objective of present invention relates to a process for the preparation of an additive capable of increasing octane comprising a medium pore zeolite bonded with clay-phosphate-silica-alumina binder.

Another objective of the present invention is to optimize the prototype combination of MFI zeolite with different $SiO_2/Al_2O_3$ ratio in order to retain the gasoline yield and improve the octane rating of gasoline thereby increasing the light olefin and aromatics selectivity in the product.

Further, another objective of the present invention is to modification of acid sites of additive with bi-valent metals selected from Gr-IIA and Gr-IB in such a way that selectivity towards light olefins and aromatics responsible for increase in octane rating of gasoline with minimum reduction of the gasoline yield.

SUMMARY OF THE INVENTION

This invention relates to an additive capable of increasing the gasoline octane (by 2-3 units) with minimum loss of gasoline. More specifically, the present invention discloses a fluid catalytic cracking additive composition capable of enhancing gasoline octane, said composition comprising 5-50 wt. % zeolite component, 0-15 wt % alumina, 5-20 wt % colloidal silica, 10-60 wt % kaolin clay, 5-15 wt % phosphate, and 0.1 to 5.0 wt. % of bivalent metal selected from Group-IIA or Group-IB, wherein the zeolite component comprises of medium pore pentasil zeolite in an amount of 1 to 50 wt. % and said zeolite consists of one or more MFI topology zeolite having $SiO_2/Al_2O_3$ mole ratio in the range of 10-280. The present invention also discloses a process for preparation of the additive.

In an embodiment of the present invention, said zeolite consists of one or more MFI topology zeolite having $SiO_2/Al_2O_3$ mole ratio in the range of 25-80.

In an embodiment of the present invention, the medium pore pentasil zeolite is selected from the group consisting of ZSM-5 Zeolite, ZSM-11 Zeolite, ZSM-12 Zeolite, ZSM-22 Zeolite, ZSM-23 Zeolite and ZSM-35 Zeolite.

In an embodiment of the present invention, the zeolites having $SiO_2/Al_2O_3$ mole ratio in the range of 25-80 are combined in the range of 1:1 to 1:4.

In an embodiment of the present invention, the acid site of zeolite in FCC catalyst additive is replaced by bivalent metal selected from Group-IIA or Group-IB bivalent metals.

In an embodiment of the present invention, the concentration of bivalent metal selected from Group-IIA or Group-IB is in the range of 0.1 to 1 wt % of bivalent metal.

In an embodiment of the present invention, the catalyst composition is having ABD<0.75 gm/cc and % attrition Index below 5.

In an embodiment of the present invention, the catalyst composition when used in combination with base FCC catalyst in 1-20 wt % increases the gasoline octane by 1-2 units with minimum loss of gasoline by 2-3 wt. %.

In an embodiment of the present invention, the present invention discloses a process for preparation of an additive comprising the steps of:
  a) preparing Clay-Alumina-slurry by,
      i) dispersing kaolin clay in demineralised water and a dispersant, said dispersant is condensation product of naphthalenesulphonic acid;
      ii) adding psedobohemite alumina;
      iii) milling the slurry for 2 hours, mixing uniformly, then adding ammonium polysilicate (Silica content=30%) and again milling for at least 30 minutes; and
      iv) adding organic acid gradually followed by addition of Ortho-phosphoric acid under vigorous stirring;
  b) preparing zeolite slurry using more than one zeolites by,
      i) dissolving di-ammonium hydrogen phosphate in demineralized water to obtain zeolite slurry; adding ZSM-5 zeolite having $SiO_2/Al_2O_3$ in range of 30 to 280 in the demineralized water under stirring; and
      ii) dissolving di-ammonium hydrogen phosphate in the demineralized water to obtain zeolite slurry; adding ZSM-5 zeolite having $SiO_2/Al_2O_3$ in the demineralized water under stirring; wherein $SiO_2/Al_2O_3$ mole ratio is different from step (i);
  c) preparing final catalyst slurry by,
      i) mixing Zeolite slurry with the clay-alumina-slurry and stirring for 30 minutes;
      ii) adding ammonium polysilicate with mixed slurry of step i) of step c) and optionally adding bivalent metal precursor dissolved in the demineralized water; and
      iii) sieving the slurry obtained in step ii) of step c), spray drying and calcining the spray dried product at 550° C.

DETAILED DESCRIPTION OF THE INVENTION

While the invention is susceptible to various modifications and/or alternative processes and/or compositions, specific embodiment thereof has been shown by way of example in tables and will be described in detail below. It should be understood, however that it is not intended to limit the invention to the particular processes and/or product/compositions disclosed, but on the contrary, the invention is to cover all modifications, equivalents, and alternatives falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below.

ZSM-5 additive are commonly used to increase the LPG and propylene. These ZSM-5 type additives crack the gasoline range molecule in light olefins such as LPG and light olefins. Therefore, conventional ZSM-5 additive increase yield of LPG and propylene at the cost of gasoline.

The present invention discloses the combination and optimization of MFI type zeolite with variable $SiO_2/Al_2O_3$ mole ratio. The proto-type zeolite is stabilized in the additive matrix and performance of the additive indicates the retention of gasoline yield with improved octane rating in comparison with conventional ZSM-5 additive.

The process disclosed includes optimization of combination and concentration of MFI type zeolite with variable $SiO_2/Al_2O_3$ mole ratio. Additive consists of one or more MFI topology zeolite having $SiO_2/Al_2O_3$ mole ratio in the range of 10-280, more particularly in the range of 25-80.

The proto-type additive disclosed in the present invention, the combination and concentration of MFI zeolite with variable $SiO_2/Al_2O_3$ mole ratio in the additive formulation is optimized to minimize the loss of gasoline. Further, the acid sites of zeolite are modified with bi-valent metals selected from Gr-IIA and Gr-IB in such a way that gasoline yield as well as octane rating of the gasoline is increased. The proprietary zeolite system can generate more selectively high-octane molecules in gasoline without appreciable cracking the gasoline.

The proto-type additive disclosed in the present invention is capable of enhancing the gasoline octane with minimum gasoline loss over zeolite Y-based FCC catalyst.

The present disclosure describes a cracking catalyst additive suitable for improving the octane rating of the gasoline with minimum loss of gasoline in comparison with conventional ZSM-5 zeolite and methods of preparing such catalyst.

Accordingly, the present invention discloses a fluid catalytic cracking additive composition capable of enhancing gasoline octane, said composition comprising 5-50 wt. % zeolite component, 0-15 wt % alumina, 5-20 wt % colloidal silica, 10-60 wt % kaolin clay, 5-15 wt % phosphate, and 0.1 to 5.0 wt. % of bivalent metal selected from Group-IIA or Group-IB, wherein the zeolite component comprises of medium pore pentasil zeolite in an amount of 1 to 50 wt. % and said zeolite consists of one or more MFI topology zeolite having $SiO_2/Al_2O_3$ mole ratio in the range of 10-280.

In an aspect of the present invention, said zeolite consists of one or more MFI topology zeolite having $SiO_2/Al_2O_3$ mole ratio in the range of 25-80.

In an aspect of the present invention, the medium pore pentasil zeolite is selected from the group consisting of ZSM-5 Zeolite, ZSM-11 Zeolite, ZSM-12 Zeolite, ZSM-22 Zeolite, ZSM-23 Zeolite and ZSM-35 Zeolite.

In an aspect of the present invention, the zeolites having $SiO_2/Al_2O_3$ mole ratio in the range of 25-80 are combined in the range of 1:1 to 1:4.

In an aspect of the present invention, the acid site of zeolite in FCC catalyst additive is replaced by bivalent metal selected from Group-IIA or Group-IB bivalent metals.

In an aspect of the present invention, the concentration of bivalent metal selected from Group-IIA or Group-IB is in the range of 0.1 to 1 wt % of bivalent metal.

In an aspect of the present invention, the catalyst composition is having ABD<0.75 gm/cc and % attrition Index below 5.

In an aspect of the present invention, the catalyst composition when used in combination with base FCC catalyst in 1-20 wt % increases the gasoline octane by 1-2 units with minimum loss of gasoline by 2-3 wt. %.

In an aspect of the present invention, the present invention discloses a process for preparation of an additive comprising the steps of:
a) preparing Clay-Alumina-slurry by,
   i) dispersing kaolin clay in demineralised water and a dispersant, said dispersant is condensation product of naphthalenesulphonic acid;
   ii) adding psedobohemite alumina;
   iii) milling the slurry for 2 hours, mixing uniformly, then adding ammonium polysilicate (Silica content=30%) and again milling for at least 30 minutes; and
   iv) adding organic acid gradually followed by addition of Ortho-phosphoric acid under vigorous stirring;
b) preparing zeolite slurry using more than one zeolites by,
   i) dissolving di-ammonium hydrogen phosphate in demineralized water to obtain zeolite slurry; adding ZSM-5 zeolite having $SiO_2/Al_2O_3$ in range of 30 to 280 in the demineralized water under stirring; and
   ii) dissolving di-ammonium hydrogen phosphate in the demineralized water to obtain zeolite slurry; adding ZSM-5 zeolite having $SiO_2/Al_2O_3$ in the demineralized water under stirring; wherein $SiO_2/Al_2O_3$ mole ratio is different from step (i);
c) preparing final catalyst slurry by,
   i) mixing Zeolite slurry with the clay-alumina-slurry and stirring for 30 minutes;
   ii) adding ammonium polysilicate with mixed slurry of step i) of step c) and optionally adding bivalent metal precursor dissolved in the demineralized water; and
   iii) sieving the slurry obtained in step ii) of step c), spray drying and calcining the spray dried product at 550° C.

It will be appreciated that several of the details set forth below examples are provided to describe the following embodiments in a manner sufficient to enable a person skilled in the relevant art to make and use the disclosed embodiments.

Example—1

Clay-Alumina-Silica slurry is prepared by dispersing 323.53 gm of clay (L01=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared by dissolving the 34.76 gm of di-ammonium hydrogen phosphate (LOI=28.07 wt %) in 102.27 gm of DM water. To this 85.23 gm of ZSM-5 zeolite having $SiO_2/Al_2O_3$=280 is added under stirring.

Zeolite slurry is mixed to the clay-alumina-slurry and stirring for 30 minutes to ensure the homogenous mixing. Finally, 125 gm of ammonium polysilicate (Silica content=30 wt %) is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2 & 3.

Example—2

Clay-Alumina-Silica slurry is prepared by dispersing 323.53 gm of clay (LOI=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared by dissolving the 34.76 gm of di-ammonium hydrogen phosphate (LOI=28.07 wt %) in 102.27 gm of DM water. To this 85.23 gm of ZSM-5 zeolite having $SiO_2/Al_2O_3$=80 is added under stirring.

Zeolite slurry is mixed to the clay-alumina-slurry and stirring for 30 minutes to ensure the homogenous mixing. Finally, 125 gm of ammonium polysilicate (Silica content=30 wt %) is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2 & 3.

Example—3

Clay-Alumina-Silica slurry is prepared by dispersing 323.53 gm of clay (LOI=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared by dissolving the 34.76 gm of di-ammonium hydrogen phosphate (LOI=28.07 wt %) in 102.27 gm of DM water. To this 85.23 gm of ZSM-5 zeolite having $SiO_2/Al_2O_3$=60 is added under stirring.

Zeolite slurry is mixed to the clay-alumina-slurry and stirring for 30 minutes to ensure the homogenous mixing. Finally, 125 gm of ammonium polysilicate (Silica content=30 wt %) is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2.

Example—4

Clay-Alumina-Silica slurry is prepared by dispersing 323.53 gm of clay (L01=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared by dissolving the 34.76 gm of di-ammonium hydrogen phosphate (LOI=28.07 wt %) in 102.27 gm of DM water. To this 85.23 gm of ZSM-5 zeolite having $SiO_2/Al_2O_3$=30 is added under stirring.

Zeolite slurry is mixed to the clay-alumina-slurry and stirring for 30 minutes to ensure the homogenous mixing. Finally, 125 gm of ammonium polysilicate (Silica content=30 wt %) is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2.

Example—5

Clay-Alumina-Silica slurry is prepared by dispersing 323.53 gm of clay (LOI=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared by dissolving the 34.76 gm of di-ammonium hydrogen phosphate (LOI=28.07 wt %) in 102.27 gm of DM water. To this 85.23 gm of ZSM-5 zeolite having $SiO_2/Al_2O_3$=30 is added under stirring.

Zeolite slurry prepared above is mixed to the clay-alumina-slurry and stirring for 30 minutes to ensure the homogenous mixing. To this 125 gm of ammonium polysilicate (Silica content=30 wt %) is added. Finally, 28.66 gm of Magnesium nitrate dissolved in 57.32 gm DM water is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2.

Example—6

Clay-Alumina-Silica slurry is prepared by dispersing 323.53 gm of clay (LOI=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared by dissolving the 34.76 gm of di-ammonium hydrogen phosphate (LOI=28.07 wt %) in 102.27 gm of DM water. To this 85.23 gm of ZSM-5 zeolite having $SiO_2/Al_2O_3$=80 is added under stirring.

Zeolite slurry prepared above is mixed to the clay-alumina-slurry and stirring for 30 minutes to ensure the homogenous mixing. To this 125 gm of ammonium polysilicate (Silica content=30 wt %) is added. Finally, 28.66 gm of Magnesium nitrate dissolved in 57.32 gm DM water is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2 & 3.

Example—7

Clay-Alumina-Silica slurry is prepared by dispersing 323.53 gm of clay (LOI=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared by dissolving the 34.76 gm of di-ammonium hydrogen phosphate (LOI=28.07 wt %) in 102.27 gm of DM water. To this 85.23 gm of 0.9 wt. % MgO exchanged ZSM-5 zeolite having $SiO_2/Al_2O_3$=30 is added under stirring.

Zeolite slurry prepared above is mixed to the clay-alumina-slurry and stirring for 30 minutes to ensure the homogenous mixing. Finally, 125 gm of ammonium polysilicate (Silica content=30 wt %) is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2 & 3.

Example—8

Clay-Alumina-Silica slurry is prepared by dispersing 323.53 gm of clay (LOI=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared in two steps using two different zeolites. In the first step, 17.38 gm of di-ammonium hydrogen phosphate (LOI=28.07 wt %) in 51.14 gm of DM water. To this 42.61 gm of ZSM-5 zeolite having $SiO_2/Al_2O_3$=30 (LOI=12 wt %) is added under stirring. In the second step, 17.38 gm of di-ammonium hydrogen phosphate (LOI=28.07 wt %) in 51.14 gm of DM water. To this 42.61 gm of ZSM-5 zeolite having $SiO_2/Al_2O_3$=80 (LOI=12 wt %) is added under stirring.

Zeolite slurry prepared above is mixed to the clay-alumina-slurry and stirring for 30 minutes to ensure the homogenous mixing. Finally, 125 gm of ammonium polysilicate (Silica content=30 wt %) is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2.

Example—9

Clay-Alumina-Silica slurry is prepared by dispersing 323.53 gm of clay (LOI=15.5 wt %) in 395.17 gm of DM water and 2.5 gm of Tamol. To this 35.71 gm of PB-950 SB grade alumina (LOI: 28.69 wt %) is added. The slurry was milled for 2 h. After uniform mixing, 125 gm of ammonium polysilicate (Silica content=30%) was added and further milled for at least 30 min. Milled slurry was recovered from the ball mill. Further, 7.5 gm of formic acid (85%) was added gradually to peptize the alumina, followed by addition of 30.34 gm of Ortho-phosphoric acid (82.4%) under vigorous stirring.

The zeolite slurry is prepared in two steps using two different zeolites. In the first step, 17.38 gm of di-ammonium hydrogen phosphate (LOI=28.07 wt %) in 51.14 gm of DM water. To this 42.61 gm of ZSM-5 zeolite having $SiO_2/Al_2O_3$=30 (LOI=12 wt %) is added under stirring. In the second step, 17.38 gm of di-ammonium hydrogen phosphate (LOI=28.07 wt %) in 51.14 gm of DM water. To this 42.61 gm of ZSM-5 zeolite having $SiO_2/Al_2O_3$=80 (LOI=12 wt %) is added under stirring.

Zeolite slurry prepared above is mixed to the clay-alumina-slurry and stirring for 30 minutes to ensure the homogenous mixing. To this, 125 gm of ammonium polysilicate (Silica content=30 wt %) is added. Finally, 28.66 gm of Magnesium nitrate dissolved in 57.32 gm DM water is added to obtain the final additive precursor slurry. The solid content and pH of the slurry was found to be 39.46 wt % and 3.5±0.5, respectively. The slurry is sieved through the 40 mess SS sieve and spray dried in a counter current spray drier having two fluid nozzles. Spray dried product was calcined at 550° C. This catalyst was subjected to metal impregnation (Ni=2200 ppm and V=6852 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in Table 2 & 3.

Properties of Feed Employed for Performance Evaluation of Catalyst Prepared Under Examples—1 to 9 is Given Below in Table-1:

TABLE 1

Feed properties
Boiling Point Distribution by Simdist

| Sr No | Attributes | Value (° C.) |
|---|---|---|
| 1 | IBP | 225.572 |
| 2 | 1% | 265.298 |
| 3 | 5% | 328.931 |
| 4 | 10% | 357.55 |
| 5 | 15% | 376.008 |
| 6 | 20% | 388.988 |
| 7 | 30% | 407.502 |
| 8 | 40% | 420.876 |
| 9 | 50% | 433.955 |
| 10 | 60% | 447.392 |
| 11 | 70% | 461.576 |
| 12 | 80% | 480.016 |
| 13 | 90% | 505.829 |
| 14 | 95% | 526.593 |
| 15 | 99% | 550.475 |
| 16 | FBP | 554.038 |

TABLE 2

Feed composition Analysis

| | |
|---|---|
| Paraffins | 23.1 |
| Monocycloparaffins | 27.8 |
| Dicycloparaffins | 15.5 |
| Tricycloparaffins | 7.5 |
| Tetracycloparaffins | 0.0 |
| Pentacycloparaffins | 0.0 |
| Hexacycloparaffins | 0.0 |
| Heptacycloparaffins | 0.0 |
| Saturates | 73.9 |
| Alkylbenzenes | 8.9 |
| Benzocycloparaffins | 3.5 |
| Benzodicycloparaffins | 2.6 |
| Naphthalenes | 3.8 |
| Acenaphenes, biphenyls | 0.0 |
| Acenaphthylenes, fluorenes | 3.8 |
| Phenanthrenes | 1.2 |
| Pyrenes | 0.0 |
| Chrysenes | 0.0 |
| Benzopyrenes | 0.0 |
| Aromatics | 23.8 |
| Thiophenes | 0.0 |
| Benzothiophenes | 2.3 |
| Dibenzothiophenes | 0.0 |
| Naphthobenzothiophenes | 0.0 |
| Sulfur Compounds | 2.3 |

Physicochemical Properties of the Octane Boosting Additive Prepared as Per Examples 1 to 9 are Given in Table-2A & 2B

TABLE 2

A: Physico-chemical properties of the octane boosting additive prepared as per examples 1 to 5

| | Additive Example-1 | Additive Example-2 | Additive Example-3 | Additive Example-4 | Additive Example-5 |
|---|---|---|---|---|---|
| Additive composition | | | | | |
| Alumina, wt % | 5.0 | 5.0 | 5.0 | 5.0 | 5.0 |
| Clay | 55.0 | 55.0 | 55.0 | 55.0 | 54.1 |
| APS, as $SiO_2$ | 15.0 | 15.0 | 15.0 | 15.0 | 15.0 |
| Zeolite-1, wt % ($SiO_2/Al_2O_3$) | 15 (280) | 15 (80) | 15 (60) | 15 (30) | 15 (30) |
| Zeolite-2, wt % ($SiO_2/Al_2O_3$) | 0 | 0 | 0 | 0 | 0 |
| $H_3PO_4$ (as $PO_4$), wt % | 10.0 | 10.0 | 10.0 | 10.0 | 10.0 |
| Magnesium Nitrate as MgO, wt % | 0 | 0 | 0.0 | 0.0 | 0.90 |
| Additive Physical properties | | | | | |
| ABD, gm/cc | 0.78 | 0.77 | 0.78 | 0.77 | 0.78 |
| Attrition Index | 3.5 | 3.6 | 3.4 | 3.5 | 3.7 |
| Performance Evaluation | | | | | |
| ROT | 510 | 510 | 510 | 510 | 510 |
| Cat/Oil | 6.02 | 6.02 | 6.02 | 6.02 | 6.02 |
| Gasoline yield | 35.54 | 33.35 | 31.86 | 30.33 | 34.7 |
| simulated RON | 91.6 | 90.5 | 90.5 | 90.7 | 89.7 |

TABLE 2

B: Physico-chemical properties of the octane boosting additive prepared as per examples 6 to 9

|  | Additive Example-6 | Additive Example-7 | Additive Example-8 | Additive Example-9 Present invention |
|---|---|---|---|---|
| Additive composition | | | | |
| Alumina, wt % | 5.0 | 5.0 | 5.0 | 5.0 |
| Clay | 54.1 | 54.1 | 55 | 54.1 |
| APS, as $SiO_2$ | 15 | 15 | 15 | 15 |
| Zeolite-1, wt % ($SiO_2/Al_2O_3$) | 15 (80) | 15 (30) | 7.5 (30) | 7.5 (30) |
| Zeolite-2, wt % ($SiO_2/Al_2O_3$) | 0 | 0 | 7.5 (80) | 7.5 (80) |
| Phosphate, wt % | 10.0 | 10.0 | 10.0 | 10.0 |
| Magnesium Nitrate as MgO, wt % | 0.90 | 0.9 | 0.0 | 0.90 |
| Additive Physical properties | | | | |
| ABD, gm/cc | 0.78 | 0.77 | 0.77 | 0.78 |
| Attrition Index | 3.5 | 3.6 | 3.5 | 3.7 |
| Performance Evaluation | | | | |
| ROT | 510 | 510 | 510 | 510 |
| Cat/Oil | 6.02 | 6.02 | 6.02 | 6.02 |
| Gasoline yield | 37.19 | 30.81 | 35.52 | 36.80 |
| simulated RON | 91.2 | 91.8 | 90.6 | 92.8 |

The gasoline RON is calculated using prefractionator PIhONA method in compliance with ASTM D 5443 and ASTM D 6839. The octane number of the gasoline samples (ranging from $C_3$-$C_{12}$ by wt % method) determined by PIONA analysis based on carbon number. The simulated RON value is calculated based on the population of Paraffins, Olefins, Naphthalene and Aromatics component against standard sample. The standard sample is a known mixture of napthenes $C_5$-$C_9$, paraffin's $C_5$-$C_{11}$, aromatics $C_6$-$C_{10}$, >200° C. ($C_{12}$HP) C11A and poly napthenes.

The performance evaluation, 5 wt % of this ZSM-5 additive was mixed with 95 wt % equilibrated RFCC catalysts and conducted reaction at a temperature of 510° C. in ACE MAT unit. The performance data of select examples at equal conversion levels is summarized in Table 3.

TABLE 3

Performance evaluation of additives

|  | Base FCC catalyst | Base FCC catalyst (95 Wt. %) + Example 6 (5 Wt. %) | Base FCC catalyst (95 Wt. %) + Example 7 (5 Wt. %) | Base FCC catalyst (95 Wt. %) + Example 9 (5 Wt. %) Present Invention |
|---|---|---|---|---|
| ROT | 510 | 510 | 510 | 510 |
| Conv. | 76.699 | +1.012 | +1.024 | +0.990 |
| DG | 2.069 | +0.107 | +0.431 | −0.570 |
| LPG | 26.21 | +8.262 | +10.446 | 4.408 |
| LCN | 39.41 | −6.194 | −8.388 | −2.606 |
| HCN | 12.12 | −1.952 | −1.833 | −0.785 |
| LCO | 17.90 | −0.608 | −0.833 | −0.885 |
| CLO | 5.39 | +0.608 | +0.833 | +0.885 |
| Coke | 4.92 | −0.223 | 0.656 | −0.447 |
| RON | 84.79 | 91.2 | 91.8 | 92.8 |

Advantages of the Present Invention

The present invention discloses the combination and optimization of the MFI type zeolite with variable $SiO_2/Al_2O_3$ mole ratio. The proto-type zeolite is stabilized in the additive matrix and performance of the additive indicates the retention of gasoline with improved octane rating in comparison with conventional ZSM-5 additive.

The process disclosed includes optimization of combination and concentration of MFI type zeolite with variable $SiO_2/Al_2O_3$ mole ratio. Additive consists of one or more MFI topology zeolite having $SiO_2/Al_2O_3$ mole ratio in the range of 10-280, more particularly in the range of 25-80.

Further, the active sites in the additive formulation are modified using the bivalent metal ions from Gr IIA and Gr IB to improve selectivity of light olefins and aromatics which responsible for improving the octane rating of gasoline.

While specific language has been used to describe the present subject matter, any limitations arising on account thereto, are not intended. As would be apparent to a person in the art, various working modifications may be made to the method in order to implement the inventive concept as taught herein.

We claim:

1. A fluid catalytic cracking additive composition for enhancing gasoline octane, the composition comprising:
   (a) 5-50 wt. % zeolite component;
   (b) 0-15 wt. % alumina;
   (c) 5-20 wt. % colloidal silica;
   (d) 10-60 wt. % kaolin clay;
   (e) 5-15 wt. % phosphate; and
   (f) 0.1-5.0 wt. % bivalent metal selected from Group-IIA or Group-IB;
   wherein the zeolite component comprises a medium pore ZSM-5 zeolite; and
   wherein the medium pore ZSM-5 zeolite consists of a first MFI topology zeolite having a mole ratio of $SiO_2/Al_2O_3$ of 30 and a second MFI topology zeolite having a mole ratio of $SiO_2/Al_2O_3$ of 80.

2. The fluid catalytic cracking additive composition as claimed in claim 1, wherein the medium pore ZSM-5 zeolite consists of the first and the second MFI topology zeolites in a ratio in a range of 1:1 to 1:4.

3. The fluid catalytic cracking additive composition as claimed in claim 1, wherein an acid site of the medium pore ZSM-5 zeolite in the fluid catalytic cracking additive is replaced by the bivalent metal selected from Group-IIA or Group-IB.

4. The fluid catalytic cracking additive composition as claimed in claim 3, wherein a concentration of the bivalent metal selected from Group-IIA or Group-IB is in a range of 0.1 to 1 wt % of the additive composition.

5. The fluid catalytic cracking additive composition as claimed in claim 1, wherein the composition comprises apparent bulk density (ABD)<0.75 gm/cc and Attrition Index below 5.

6. The fluid catalytic cracking additive composition as claimed in claim 1, wherein the composition when used in combination with base fluid catalytic cracking (FCC) catalyst in an amount of 1-20 wt. % increases the gasoline octane by 1-2 units with a minimum loss of gasoline by an amount of 2-3 wt. %.

7. A process for preparation of a fluid catalytic cracking additive, the process comprising the steps of:
   a) preparing a clay-alumina-silica slurry by:
      i) dispersing kaolin clay and a dispersant in demineralized water, wherein the dispersant is a condensation product of naphthalenesulphonic acid;
      ii) adding-pseudoboehmite alumina to step i) to prepare a clay-alumina slurry;

iii) milling the clay-alumina slurry for 2 hours, mixing uniformly, adding ammonium polysilicate and milling for at least 30 minutes, wherein silica content of ammonium polysilicate is 30%; and iv) adding an organic acid gradually followed by addition of ortho-phosphoric acid under vigorous stirring, to obtain the clay-alumina-silica slurry;

b) preparing a zeolite slurry in two steps using a first and a second MFI topology zeolites by:

i) dissolving di-ammonium hydrogen phosphate in demineralized water and adding the first MFI topology zeolite having a mole ratio of $SiO_2/Al_2O_3$ of 30 under stirring to form a first mixture;

ii) dissolving di-ammonium hydrogen phosphate in demineralized water and adding the second MFI topology zeolite having a mole ratio of $SiO_2/Al_2O_3$ of 80 under stirring to form a second mixture, wherein the $SiO_2/Al_2O_3$ mole ratio is different from step i); and iii) combining the first and the second mixture to form the zeolite slurry;

c) preparing the fluid catalytic cracking additive by:

i) mixing the zeolite slurry of step b) with the clay-alumina-silica slurry of step a) and stirring for 30 minutes to obtain a mixed slurry;

ii) adding ammonium polysilicate to the mixed slurry of step i) and optionally adding a bivalent metal precursor dissolved in demineralized water to obtain a final additive precursor slurry;

iii) sieving and spray drying the final additive precursor slurry obtained in step ii) to obtain a spray dried product; and iv) calcining the spray dried product at a temperature of 550° C. to obtain the fluid catalytic cracking additive.

* * * * *